United States Patent
Lesovik et al.

(10) Patent No.: US 12,170,724 B2
(45) Date of Patent: Dec. 17, 2024

(54) METHOD, APPARATUS, COMPUTER PROGRAM AND DATA CARRIER FOR DETERMINING A SHARED SECRET CRYPTOGRAPHIC KEY

(71) Applicant: Terra Quantum AG, St. Gallen (CH)

(72) Inventors: Gordey Lesovik, St. Gallen (CH);
Nikita Kirsanov, St. Gallen (CH);
Nurbolat Kenbayev, St. Gallen (CH)

(73) Assignee: Terra Quantum AG, St. Gallen (CH)

( * ) Notice: Subject to any disclaimer, the term of this patent is extended or adjusted under 35 U.S.C. 154(b) by 46 days.

(21) Appl. No.: 17/488,947

(22) Filed: Sep. 29, 2021

(65) Prior Publication Data

US 2022/0109565 A1    Apr. 7, 2022

(30) Foreign Application Priority Data

Oct. 6, 2020  (EP) ..................................... 20200370

(51) Int. Cl.
*H04L 9/08* (2006.01)

(52) U.S. Cl.
CPC .......... *H04L 9/0838* (2013.01); *H04L 9/0825* (2013.01); *H04L 9/085* (2013.01); *H04L 9/0869* (2013.01)

(58) Field of Classification Search
None
See application file for complete search history.

(56) References Cited

U.S. PATENT DOCUMENTS

| 7,403,623 B2 * | 7/2008 | Cerf ...................... H04L 9/0858 380/278 |
| 11,621,836 B2 * | 4/2023 | Ashrafi ................. H04L 9/3239 713/171 |

(Continued)

FOREIGN PATENT DOCUMENTS

| CN | 106130723 A | 11/2016 |
| CN | 110365477 A | 10/2019 |

(Continued)

OTHER PUBLICATIONS

Lodewyck et al. and Quantum Key Distribution with Coherent States at Telecom Wavelength and Proc. of 31 st European Conference on Optical Communication (ECOC 2005), 2005, pp. 71-74 (Year: 2005).*

(Continued)

*Primary Examiner* — Saleh Najjar
*Assistant Examiner* — Shadi H Kobrosli
(74) *Attorney, Agent, or Firm* — Leydig, Voit & Mayer, Ltd

(57) ABSTRACT

A system and method for determining a secret cryptographic key shared between a sending unit and a receiving unit for secure communication includes obtaining, by the sending unit, a random bit sequence, and transmitting, at the sending unit, a first sequence of electromagnetic pulses to the receiving unit via a communication channel, wherein each electro-magnetic pulse of the first sequence of electro-magnetic pulses corresponds to a bit of the random bit sequence according to a ciphering protocol, the signal loss is determined in the communication channel caused by an eavesdropper, and an information advantage is estimated over the eavesdropper based on the determined signal loss. Privacy amplification is performed based on the estimated (Continued)

information advantage in order to establish a shared secret crypto-graphic key.

13 Claims, 3 Drawing Sheets

(56) References Cited

U.S. PATENT DOCUMENTS

| | | | | |
|---|---|---|---|---|
| 2004/0109564 | A1* | 6/2004 | Cerf | H04L 9/0858 380/256 |
| 2009/0175450 | A1* | 7/2009 | Brandt | H04L 9/0858 380/256 |
| 2009/0268901 | A1 | 10/2009 | Lodewyck et al. | |
| 2016/0285621 | A1* | 9/2016 | Yuen | H04L 9/0656 |

FOREIGN PATENT DOCUMENTS

| | | | | |
|---|---|---|---|---|
| CN | 110880956 A | | 3/2020 | |
| EP | 3043508 A1 | * | 7/2016 | H04L 9/0844 |
| JP | 2016-178381 A | | 10/2016 | |
| JP | 2017169187 A | * | 9/2017 | H04L 63/061 |
| JP | 2018-148544 A | | 9/2018 | |
| WO | WO-2020053448 A1 | * | 3/2020 | G01N 21/47 |
| WO | WO-2020177848 A1 | * | 9/2020 | H04L 9/0858 |
| WO | WO-2021010429 A1 | * | 1/2021 | |

OTHER PUBLICATIONS

European Patent Office, European Search Report in European Patent Application No. 20200370.3, 7 pp. (Mar. 3, 2021).

Li et al. "Memory-Saving Implementation of High-Speed Privacy Amplification Algorithm for Continuous-Variable Quantum Key Distribution," IEEE Photonics Journal, 10 (5) (Sep. 2018).

Tang et al. "Research and Experiment of Open Quantum Cryptography Communication System Architecture and Co-Fiber Transmission Technology" China Academic Journal Electronic Publishing House (Aug. 1, 2018).

Chinese Patent Application No. 202111157079.5, Office Action (Nov. 27, 2023).

* cited by examiner

METHOD, APPARATUS, COMPUTER PROGRAM AND DATA CARRIER FOR DETERMINING A SHARED SECRET CRYPTOGRAPHIC KEY

CROSS-REFERENCE TO RELATED APPLICATIONS

This patent application claims the benefit of European Patent Application No. 20200370.3, filed Oct. 6, 2020, which is fully incorporated herein by reference.

TECHNICAL FIELD

The disclosure relates to a method, apparatus, computer program and data carrier for determining a secret cryptographic key shared between a sending unit and a receiving unit for secure communication.

BACKGROUND

The field of quantum communications promises means for a truly secure exchange of information between a sender and a receiver by exploiting the peculiar properties of quantum mechanics that manifest, e.g., in Heisenberg's uncertainty principle and the non-cloning theorem. For example, if a true quantum state is transmitted from a sender (Alice) to a receiver (Bob) via a quantum channel, an eavesdropper (Eve) attempting to measure a small part of the signal associated with said quantum state would gain only little information, because quantum fluctuations would largely dominate the small signal attainable by the eavesdropper. Thus, a one shot measurement performed by the eavesdropper could not yield any meaningful results and the communication between the sender and the receiver may be considered as fully secure.

Therefore, various quantum key distribution schemes rely on optical attenuators or high-quality single photon sources exhibiting strong optical nonlinearities, high-precision photon counting detectors as well as extremely low-loss transmission lines in order to ensure that quantum states exhibiting large quantum fluctuations can be generated and transmitted with minimal intrinsic losses.

However, aside from the complexity of the required quantum hardware, the low key exchange rate permitted by state of the art photon detectors as well as the limited range of quantum communications due to dissipation and decoherence severely limit the practical applicability of those schemes. In addition, some backdoors in quantum communications, e.g., by deliberately attacking sensitive hardware components and thereby creating information-leaking side channels, have been discovered and provide severe security risks.

OVERVIEW OF THE DISCLOSURE

It is an objective of the present disclosure to overcome such limitations and provide a simple and practical method, apparatus, computer program and data carrier for determining and distributing a secret cryptographic key enabling secure communications with a high key exchange rate.

This objective is achieved by the method, apparatus, computer program and data carrier as set forth in claims 1, 11, 14 and 15. Advantageous developments and embodiments are described in the dependent claims.

The disclosure relates to a method for determining a secret cryptographic key shared between a sending unit and a receiving unit for secure communication. The method comprises the following steps:

A first step comprises obtaining, by the sending unit, a random bit sequence.

A second step comprises transmitting, at the sending unit, a first sequence of electromagnetic pulses to the receiving unit via a communication channel. Thereby, each electromagnetic pulse of the first sequence of electromagnetic pulses corresponds to a bit of the random bit sequence according to a ciphering protocol.

A third step comprises receiving, at the receiving unit, a second sequence of electromagnetic pulses corresponding to the transmitted first sequence of electromagnetic pulses, and deciphering the second sequence of electromagnetic pulses based on the ciphering protocol.

A fourth step comprises applying information reconciliation based on the received second sequence of electromagnetic pulses in order to establish a shared bit sequence.

A fifth step comprises determining a signal loss in the communication channel caused by an eavesdropper.

A sixth step comprises estimating an information advantage over the eavesdropper based on the determined signal loss.

A seventh step comprises performing privacy amplification based on the shared bit sequence and the estimated information advantage in order to establish a shared secret cryptographic key.

With the proposed method a secret cryptographic key may be determined and distributed between the sending unit and the receiving unit with a high level of security and efficiency. The proposed scheme may permit to utilize quantum fluctuations without the need for employing strong attenuators, single photon sources and/or single photon detectors. In particular, by encoding/ciphering a random bit sequence into a first sequence of electromagnetic pulses according to a ciphering protocol, a particular robust and flexible encoding scheme may be realized. Thereby, the first sequence of electromagnetic pulses may be transmitted over a lossy communication channel while ensuring a robust detection and reliable decoding/deciphering at the receiving side even in the presence of dissipation and decoherence.

By performing information reconciliation based on the received second sequence of electromagnetic pulses, any inconclusive results may be discarded and the error rate of deciphering may be considerably reduced. Moreover, by determining signal loss in the communication channel caused by a potential eavesdropper, estimating the information advantage over the eavesdropper and using said estimation result in a privacy amplification scheme may permit to reduce and even eradicate the information of the eavesdropper, thereby ensuring the secrecy of the established shared cryptographic key at a high key exchange rate.

Preferably, the second step is carried out after the first step is carried out, the third step is carried out after the second step is carried out, the fourth step is carried out after the third step is carried out, and/or the seventh step is carried out after the fourth step is carried out. Optionally, the fifth step is carried out after the fourth step is carried out and/or the sixth step is carried out after the fifth step is carried out.

However, at least some steps may be carried out in a different order. Exemplarily, the fifth step and/or the sixth step may also be carried out before the first step is carried out and/or before the second step is carried out and/or before the third step is carried out and/or before the fourth step is carried out.

In addition, the method may comprise an initial step of obtaining, by the sending unit and/or the receiving unit, the ciphering protocol. The initial step may also comprise determining, by the sending unit, a ciphering protocol and/or transmitting, by the sending unit, a/the ciphering protocol to the receiving unit, e.g., by using an authenticated public classical channel or the communication channel. The initial step may be carried out before the first step or before the second step is carried out.

Optionally, when the fifth step and/or the sixth step are carried out before the second step is carried out, the estimating of the information advantage may comprise optimizing the information advantage for the determined signal loss caused by an eavesdropper as a function of at least one ciphering parameter, and determining the ciphering protocol according to the optimization result in order to ensure a maximal information advantage over the eavesdropper. The optimizing of the information advantage may be achieved by analytical or numerical means. For example, the information advantage may be calculated using Shannon information theory. More specifically, the information advantage may be expressed in terms of the signal loss caused by an eavesdropper, at least one ciphering parameter and/or the intrinsic signal loss of the communication channel. The intrinsic signal loss of the communication channel may be predetermined and/or measured together with the signal loss caused by an eavesdropper, as will be explained further below.

The at least one ciphering parameter may correspond to the degree of indistinguishability between a first quantum state and a second quantum state. The first quantum state and the second quantum state may be used in the ciphering protocol in order to distinguish between a bit with a bit value 0 and a bit with a bit value 1. The first quantum state may be assigned according to the ciphering protocol to a bit of the random bit sequence with bit value 0 and the second quantum state may be assigned according to the ciphering protocol to a bit of the random bit sequence with bit value 1.

More specifically, the ciphering protocol may comprise an assignment rule. The assignment rule may comprise assigning bit values to quantum states and/or electromagnetic pulses. Preferably, the ciphering protocol comprises a binary encoding scheme, wherein each electromagnetic pulse of the first sequence corresponds to a bit of the random bit sequence. According to the assignment rule, a first electromagnetic pulse and/or the first quantum state may be assigned to a bit value 0, and a second electromagnetic pulse and/or the second quantum state may be assigned to a bit value 1. More specifically, according to the ciphering protocol a first electromagnetic pulse of the first sequence may correspond to the first quantum state and may be assigned to a bit of the random bit sequence with a bit value 0. A second electromagnetic pulse of the first sequence may correspond to the second quantum state and may be assigned to a bit of the random bit sequence with the bit value 1. Thus, the first sequence of electromagnetic pulses may comprise only first electromagnetic pulses and second electromagnetic pulses.

The ciphering protocol may also comprise ciphering mode information, wherein according to the ciphering mode information the ciphering mode is intensity ciphering or phase ciphering.

If the ciphering mode is intensity ciphering, the average photon number of the first electromagnetic pulse and/or first quantum state may be different from the average photon number of the second electromagnetic pulse and/or second quantum state. The phase of the first electromagnetic pulse and/or the first quantum state and the phase of the second electromagnetic pulse and/or the second quantum state may be identical.

If the ciphering mode is phase-ciphering, the phase of the first electromagnetic pulse and/or the first quantum state may be different from the phase of the second electromagnetic pulse and/or the second quantum state. The average photon number of the first electromagnetic pulse and/or first quantum state and the average photon number of the second electromagnetic pulse and/or second quantum state may be identical.

Preferably, the first quantum state and the second quantum state are coherent states. In the following, the first quantum state may also be called the first coherent state, and the second quantum state may also be called the second coherent state. Most preferably, the first coherent state and the second coherent state are quasi-classical coherent states. Correspondingly, the electromagnetic pulses of the first sequence of electromagnetic pulses and/or the electromagnetic pulses of the second sequence of electromagnetic pulses may be coherent electromagnetic pulses, preferably quasi-classical coherent electromagnetic pulses.

Alternatively, the electromagnetic pulses of the first sequence and/or the second sequence and/or the first quantum state and/or the second quantum state may also correspond to the/a squeezed state(s) or the/a Fock state(s).

Exemplary, the average photon number of the first quantum state and/or the second quantum state may be greater than 1. The average photon number of the first quantum state and/or the second quantum state may be smaller than 10,000.

The proposed method for determining a secret cryptographic key shared between a sending unit and a receiving unit may be used for secure communications over short as well as long distances. Optionally, the photons of the first electromagnetic pulse(s) and the photons of the second electromagnetic pulse(s) may be microwave photons, terahertz photons or optical photons. In case of microwave photons, long distance communications may refer to in the range of several meters or several kilometers. In case of terahertz or optical photons, long distance communications may refer to communications over several hundred or several thousand kilometres.

In particular, when the first electromagnetic pulse and the second electromagnetic pulse correspond to quasi-classical coherent states, the part of the signal that an eavesdropper can seize from the transmitted first sequence of electromagnetic pulses may still exhibit large quantum fluctuations since the number of photons of the transmitted electromagnetic pulses may still be sufficiently small. Therefore, the eavesdropper may not be able to efficiently amplify said small part of the signal and gain only little information about the random bit sequence.

The degree of indistinguishability of the first quantum state and the second quantum state may be defined as the absolute value of the overlap matrix element of the first quantum state and the second quantum state.

When the degree of indistinguishability is small, the first quantum state and the second quantum state may be almost orthogonal and perfectly distinguishable. Therefore, in order to reduce the error rate of deciphering at the receiving unit it may be advantageous if the degree of indistinguishability of the first quantum state and the second quantum state is small and/or decreased. The degree of indistinguishability may be smaller than 1.

On the other hand, if the degree of indistinguishability between the first quantum state and the second quantum state is too small, the eavesdropper may be able to efficiently amplify even a small part of the signal. Preferably, the degree of indistinguishability is larger than 0.

Moreover, the information advantage over the eavesdropper determines the key generation rate/speed. Both parameters depend sensitively on the degree of indistinguishability between the first quantum state and the second quantum state of the ciphering protocol. It may thus be advantageous to determine an optimal degree of indistinguishability by first optimizing the information advantage over the eavesdropper as described further above and determining the ciphering protocol, i.e., the first quantum state and the second quantum state, such that their degree of indistinguishability corresponds to the optimal value.

Optionally, the second step comprises amplifying the transmitted first sequence of electromagnetic pulses in or along the communication channel and/or at the receiving unit. Optionally, the amplifying of the transmitted first sequence of electromagnetic pulses may be carried out at regular distances along the communication channel, e.g., every 50 km or 100 km. The usage of in-line amplifiers may permit to compensate signal loss in the communication channel and achieve long distance communication at comparably low cost.

The third step may comprise measuring the intensities and/or the phases of the second sequence of electromagnetic pulses, e.g., by using a homodyne detector, a heterodyne detector, a photon counting detector or a combination thereof. For example, if phase-ciphering is employed according to the ciphering protocol, the third step may comprise measuring the phases of the electromagnetic pulses of the second sequence. If intensity-ciphering is employed according to the ciphering protocol, the third step may comprise measuring the intensities of the electromagnetic pulses of the second sequence.

The third step may comprise deciphering, at the receiving unit, the second sequence of electromagnetic pulses in order to obtain an approximate result for the random bit sequence. The approximate result for the random bit sequence obtained from deciphering the second sequence of electromagnetic pulses may not be exactly identical to the random bit sequence obtained by the sending unit by using a random number generator.

For example, if the first quantum state and the second quantum state are not orthogonal, the deciphering of the second sequence of electromagnetic pulses may lead to inconclusive results, wherein according to a measured phase or intensity of an electromagnetic pulse of the received second sequence, the respective electromagnetic pulse cannot unambiguously be identified with a bit value 0 or a bit value 1. The inconclusive results, i.e., the corresponding bits, may be discarded by performing information reconciliation in the fourth step described further below.

Optionally, the third step may also comprise measuring both quantities, i.e., phase and intensity, of the electromagnetic pulses of the second sequence.

For example, if the ciphering protocol comprises intensity-ciphering the intensities of the received electromagnetic pulses may be measured in order to decipher the second sequence of electromagnetic pulses. In addition, their phases may be measured in order to determine the complex-valued amplitude of the received electromagnetic pulses, and the method may use this information when determining the information gain obtained over the eavesdropper in the sixth step.

The fourth step, i.e., information reconciliation, may be carried out in order to discard inconclusive results of the deciphering of the second sequence of electromagnetic pulses. For that purpose, the fourth step may comprise announcing, by the receiving unit, the inconclusive results using an authenticated public classical channel.

Optionally, the fourth step may comprise sending feedback information from the receiving unit to the sending unit using an authenticated public classical channel, wherein the feedback information may include information about inconclusive results obtained from the deciphering of the second sequence of electromagnetic pulses. The inconclusive results may then be discarded by the sending unit and the receiving unit in order to establish a shared bit sequence, i.e., a bit sequence shared between the sending unit and the receiving unit. Thus, the shared bit sequence may be shorter than the random bit sequence obtained by the sending unit in the first step.

In case an eavesdropper seizes part of the signal associated with the transmitted first sequence of electromagnetic pulses, the shared bit sequence established in the fourth step may not be fully secure. Therefore, the signal loss of the communication channel caused by an eavesdropper may be determined in the fifth step and used in the sixth step when estimating the information advantage over the eavesdropper. The estimated information advantage over the eavesdropper may then be used in the seventh step in order to establish the shared secret cryptographic key using privacy amplification.

The determining of the signal loss in the communication channel caused by an eavesdropper may comprise transmitting at least one randomized electromagnetic test pulse from the sending unit to the receiving unit via the communication channel. At the receiving unit the at least one randomized electromagnetic test pulse may be detected and its phase and/or intensity may be measured. The at least one randomized electromagnetic test pulse may correspond to a high-intensity coherent state. A high-intensity coherent state may comprise an average photon number that is greater than 10,000, preferably greater than 100,000.

The signal loss in the communication channel caused by an eavesdropper may then be determined from the at least one randomized electromagnetic test pulse received at the receiving unit. For example, the sending unit may send test pulse information about the at least one randomized electromagnetic test pulse to the receiving unit, e.g., via an authenticated public classical channel.

Exemplarily, the test pulse information may comprise information about the transmit time, intensity, phase, duration and/or shape of the at least one electromagnetic test pulse. Exemplarily, the phase and/or intensity of the at least one transmitted randomized electromagnetic test pulse may be measured at the receiving unit and compared with the phase and/or intensity of the at least one electromagnetic test pulse sent by the sending unit in order to determine the signal loss in the communication channel caused by an eavesdropper.

Preferably, the test pulse information is sent to the receiving unit after the at least one randomized electromagnetic test pulse has been received by the receiving unit. In this way, an eavesdropper attempting to seize information about the at least one randomized electromagnetic test pulse may be forced to first measure the at least one randomized electromagnetic test pulse and subsequently reproduce it, thereby prolonging the transmission. The corresponding abnormal delay may be detected by the receiving unit. In that case, the transmitting of at least one randomized electromagnetic test pulse may be repeated until no abnormal delay is detected at the receiving unit. This may ensure that the at least one randomized electromagnetic test pulse is not corrupted or measured by the eavesdropper.

By comparing the test pulse information with the at least one electromagnetic test pulse received at the receiving unit, a total signal loss may be determined. If the communication channel is ideal, i.e., no intrinsic signal loss occurs in or along the communication channel in the absence of an eavesdropper, the total signal loss may correspond to the signal loss caused by an eavesdropper. If the communication channel is not ideal, i.e., intrinsic signal loss occurs in or along the communication channel even in the absence of an eavesdropper, the signal loss caused by an eavesdropper may be determined from the measured total signal loss and the intrinsic signal loss. The intrinsic signal loss may be predetermined, e.g., measured in advance or calculated/estimated based on a theoretical model of the communication channel.

The at least one randomized electromagnetic test pulse may be a high-intensity coherent electromagnetic pulse. Preferably, the at least one randomized electromagnetic test pulse comprises at least $10^4$ photons. The at least one randomized electromagnetic test pulse may also comprise more than $10^5$ photons.

The at least one randomized electromagnetic test pulse may comprise a random pulse intensity and/or a random pulse phase and/or a random pulse duration and/or a random pulse shape.

Alternatively or additionally, the signal loss in the communication channel caused by an eavesdropper may be determined from a sequence of randomized electromagnetic test pulses received at the receiving unit. The sequence of randomized electromagnetic test pulses may correspond to multiple randomized electromagnetic test pulses. More specifically, the sending unit may generate or obtain an auxiliary random bit sequence and encode the auxiliary random bit sequence into the sequence of randomized electromagnetic test pulses, wherein each electromagnetic test pulse of the sequence of randomized electromagnetic test pulses corresponds to a bit of the auxiliary random bit sequence according to an auxiliary ciphering protocol.

More specifically, the auxiliary ciphering protocol may comprise an assignment rule. According to the assignment rule of the auxiliary ciphering protocol a first electromagnetic test pulse corresponding to a first classical state may be assigned to a bit value 0, and a second electromagnetic test pulse corresponding to a second classical state may be assigned to a bit value 1. The ciphering mode of the auxiliary ciphering protocol may be phase-ciphering or intensity-ciphering. The auxiliary ciphering protocol may be sent from the sending unit to the receiving unit after the receiving unit has received the sequence of randomized electromagnetic test pulses.

Preferably, the intrinsic loss of the communication channel in the absence of an eavesdropper is also determined, predetermined and/or estimated.

Optionally, the communication channel may be prepared and properly installed such that it exhibits no points of inflections or crude junctions. In that case the intrinsic signal loss in the communication channel may occur solely due to Rayleigh scattering along the whole communication channel. Therefore, the eavesdropper may not be able to efficiently exploit the intrinsic signal loss in order to seize part of the signal associated with the transmitted first sequence. Instead, the eavesdropper may bend the communication channel near the sending unit and measure the transcending electromagnetic modes.

In particular, if the intrinsic loss in the communication channel, e.g., due to Rayleigh scattering, is appreciable, the fifth step may also comprise determining the intrinsic loss of the communication channel. This may be achieved by transmitting at least one initial electromagnetic pulse from the sending unit to the receiving unit via the communication channel, and measuring the at least one transmitted initial electromagnetic pulse at the receiving unit. Thereby, the at least one initial electromagnetic pulse may be transmitted on a very short time scale before the eavesdropper has a chance to intrude into the communication channel.

The at least one initial electromagnetic pulse may also correspond to a high-intensity coherent state.

The phase and/or intensity of the at least one initial transmitted electromagnetic pulse may be measured at the receiving unit and compared with the phase and/or intensity of the at least one initial electromagnetic pulse sent by the sending unit in order to determine the intrinsic signal loss in the communication channel. The intrinsic loss may also be determined, predetermined or estimated using a theoretical or numerical model of the communication channel and/or using a different method/experiment.

In the sixth step, the information advantage over an eavesdropper may be estimated by using Shannon information theory. Specifically, the sixth step may comprise estimating the maximum of information obtained by an eavesdropper about the shared bit sequence established in the fourth step. The maximum of information obtained by an eavesdropper about the shared bit sequence established in the fourth step may be estimated based on the degree of indistinguishability of the first quantum state and the second quantum state, the determined signal loss in the communication channel caused by an eavesdropper and/or the intrinsic signal loss in the communication channel.

The sixth step may also comprise estimating the mutual information of the sending unit and the receiving unit based on the degree of indistinguishability of the first quantum state and the second quantum state, the determined signal loss in the communication channel caused by an eavesdropper and/or the intrinsic signal loss in the communication channel.

The information advantage over an eavesdropper may then be determined or estimated by subtracting the maximum of information gained by the eavesdropper about the shared bit sequence from the mutual information of the sending unit and the receiving unit.

In this way, the functional dependence of the information advantage over an eavesdropper on the degree of indistinguishability of the first quantum state and the second quantum state, the determined signal loss in the communication channel caused by an eavesdropper and/or the intrinsic signal loss in the communication channel can be derived and used for the optimization of the information advantage in order to determine an optimal ciphering protocol as described further above.

In this case, the estimate of the information advantage over an eavesdropper in the sixth step may correspond to the theoretical maximum of the information advantage over an eavesdropper. The functional dependence of the information advantage over an eavesdropper may be stored electronically in an electronic storage device of the sending unit and may be represented as a quasi-continuous curve, a discrete set or an algebraic or numerical expression/function.

Optionally, the signal loss in the communication channel caused by an eavesdropper may be determined repeatedly and/or at regular time intervals and/or before the second step is carried out. Correspondingly, the information advantage over an eavesdropper may be estimated and/or updated multiple times, e.g., each time the signal loss caused by an eavesdropper is determined.

In an embodiment, the second step, the third step, the fourth step, the fifth step, the sixth step and/or the seventh step may only be carried out once the estimated information advantage over an eavesdropper is larger than 0 and/or exceeds a predetermined threshold, in order to ensure that the key generation rate/speed exceeds a minimal predetermined value.

The method may also comprise an adaptive ciphering scheme/protocol. The ciphering protocol may be adapted after the fourth step is carried out and/or before the second step is carried out. The adapting of the ciphering protocol may comprise repeatedly carrying out at least the second step, the third step and the fourth step based on the adapted ciphering protocol in order to increase the length of the shared bit sequence in the fourth step and/or to decrease the error rate of deciphering at the receiving unit in the fourth step.

According to the adaptive ciphering scheme/protocol an adapt step may be carried out, e.g., after the fourth and/or fifth step is carried out, wherein the adapt step may comprise adapting the ciphering protocol based on the signal loss caused by an eavesdropper determined in the fifth step. At least the second step, the third step and the fourth step may be repeated based on the adapted ciphering protocol, e.g., before the sixth step and the seventh step are carried out. The adaptive ciphering may also comprise repeating the first step and/or the fifth step.

The ciphering protocol may be adapted by adapting the degree of indistinguishability of the first quantum state and the second quantum state, and/or the average photon number of the first quantum state and/or the average photon number of the second quantum state. More specifically, the ciphering protocol may be adapted by decreasing the degree of indistinguishability of the first quantum state and the second quantum state if the determined signal loss caused by an eavesdropper is below a predetermined threshold, and/or by increasing the degree of indistinguishability of the first quantum state and the second quantum state if the determined signal loss caused by an eavesdropper is above a predetermined threshold.

For intensity-ciphering, the degree of indistinguishability may be increased by decreasing the difference in the average photon number of the first quantum state and the second quantum state. The degree of indistinguishability may be decreased by increasing the difference in the average photon number of the first quantum state and the second quantum state.

For phase-ciphering the degree of indistinguishability may be increased by decreasing the sum of the average photon number of the first quantum state and the second quantum state. The degree of indistinguishability may be decreased by increasing the sum of the average photon number of the first quantum state and the second quantum state.

Alternatively or additionally, the ciphering protocol may also be adapted until or such that a termination condition is fulfilled. The termination condition may correspond to the positivity of the information advantage over an eavesdropper. In that case, the adapt step may also be carried out after the sixth step. The ciphering protocol may also be adapted in order to ensure a minimal information advantage over an eavesdropper, and/or a minimal key generation speed/rate.

Optionally, also the fifth step and/or the sixth step may be repeated in order to examine/check whether the termination condition is fulfilled and/or a minimal information advantage over an eavesdropper and/or a minimal key generation speed/rate is ensured. If this is not the case, the adapting of the ciphering protocol and at least the second step, the third step and the fourth step and, possibly, also the fifth step and the sixth step, may be repeated, and the termination condition may be evaluated/checked after each repetition of those steps until the termination condition is fulfilled. Only then, the seventh step may be carried out.

According to the seventh step, privacy amplification may be performed in order to reduce or completely eradicate the information of an eavesdropper about the to-be-determined secret cryptographic key. This may be achieved by distilling a shared secret cryptographic key from the shared bit sequence established in the fourth step with the help of one-way public discussion between the sending unit and the receiving unit.

More specifically, the privacy amplification may comprise distilling from the shared bit sequence obtained in the fourth step a shared secret cryptographic key with length $L_f = L \Delta I$, where L is the length of the random bit sequence obtained in the first step and $\Delta I$ is the information advantage over an eavesdropper estimated in the sixth step. This may be achieved by shrinking the shared bit sequence of length L $I_{AB}$ established in the fourth step using a random mapping function g: $\{0,1\}^{LI_{AB}} \to \{0,1\}^{L_f}$, where $I_{AB}$ denotes the mutual information between the sending unit and the receiving unit about the random bit sequence. With this choice, a high key exchange rate/speed $L_f/L$ may be achieved. Before determining the length of the shared secret cryptographic key in this way, the estimated information advantage over an eavesdropper may be rounded to the nearest integer.

The disclosure also relates to an apparatus configured to carry out the steps of the method as described above.

In particular, the apparatus may comprise at least one sending unit, at least one receiving unit, and optionally at least one communication channel that communicatively connects the at least one sending unit and the at least one receiving unit.

The at least one sending unit may comprise a first electronic evaluation and control unit.

Optionally, the at least one sending unit comprises a random number generator configured to generate the random bit sequence, and/or an electromagnetic radiation source configured to generate the first sequence of electromagnetic pulses and/or at least one randomized electromagnetic test pulse and/or at least one initial electromagnetic pulse.

Optionally, the random number generator may be a classical random number generator.

Optionally, the electromagnetic radiation source may be a laser, a terahertz radiation source or a microwave radiation source.

The at least one receiving unit may comprise a second electronic evaluation and control unit.

Optionally, the at least one receiving unit may comprise a detector unit configured to measure intensities and/or phases of the second sequence of electromagnetic pulses and/or at least one randomized electromagnetic test pulse and/or at least one initial electromagnetic pulse.

Preferably, the at least one communication channel is a transmission line or an optical fibre.

Most preferably, the at least one communication channel comprises at least one or multiple in-line amplifier(s). Multiple in-line amplifiers may be arranged at regular distances along the communication channel, and may be configured to amplify the transmitted first sequence of electromagnetic pulses.

Optionally, the at least one communication channel is configured to exhibit intrinsic signal loss only due to Rayleigh scattering. The intrinsic loss of the at least one communication channel due to attenuation and/or Rayleigh scattering may exceed 3 dB.

The apparatus may additionally comprise at least one authenticated public classical channel configured to transmit feedback information from the at least one receiving unit to the at least one sending unit, e.g., for performing information reconciliation and/or privacy amplification.

The sending unit may be configured to perform the initial step and/or the first step and/or the adapt step. The sending unit and the communication channel may be configured to perform the second step.

The receiving unit may be configured to perform the third step and the sixth step. The sending unit, the receiving unit and the authenticated public classical channel may be configured to perform the fourth step and the seventh step. The sending unit, the receiving unit and the communication channel may be configured to perform the fifth step.

The first electronic evaluation and control unit and/or the second electronic evaluation and control unit may comprise at least one computing unit, at least one measurement unit and/or at least one electronic storage unit. The at least one computing unit may comprise at least one of a processor, a CPU (central processing unit), a GPU (graphical processing unit).

The disclosure also relates to a computer program comprising instructions which, when the program is executed by a computer, cause the computer to carry out the steps of the method as described above. The computer program (or a sequence of instructions) may use software means for performing the method for determining a secret cryptographic key shared between a sending unit and a receiving unit for secure communications when the computer program runs in a computing unit. The computer program can be stored directly in an internal memory, a memory unit or the data storage unit of the at least one electronic evaluation and control unit.

The disclosure also relates to a computer-readable data carrier having stored thereon the computer program described above. The computer program product can be stored in machine-readable data carriers, preferably digital storage media.

In summary, a simple and practical method, apparatus, computer program and data carrier for determining a secret cryptographic key shared between a sending unit and a receiving unit for secure communications has been proposed. The shared secret cryptographic key can be used for a wide range of symmetric cryptographic protocols. In particular, with the proposed disclosure key distribution with a high level of security and high key exchange rate can be achieved.

BRIEF DESCRIPTION OF THE FIGURES

Exemplary embodiments of the disclosure are illustrated in the drawings and will now be described with reference to FIGS. 1 to 6.

In the figures.

DETAILED DESCRIPTION

Figure 1:
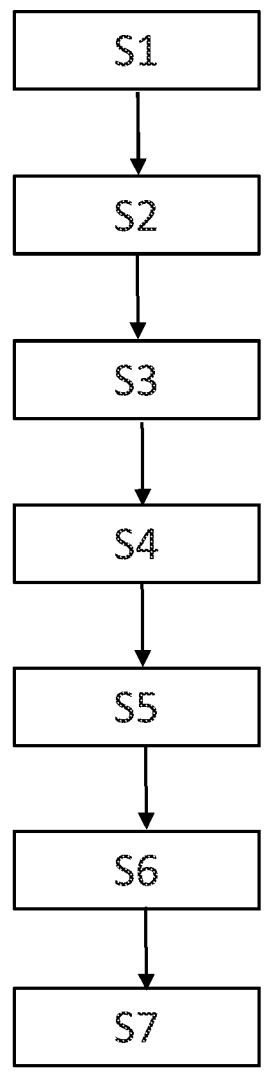
FIG. 1 shows a schematic flow diagram of an embodiment of the method.

FIG. 1 shows a schematic flow diagram of an embodiment of the method for determining a secret cryptographic key shared between a sending unit 1 and a receiving unit 2 for secure communication. The method comprises a first step S1, a second step S2, a third step S3, a fourth step S4, a fifth step S5, a sixth step S6 and a seventh step S7 carried out consecutively.

The first step S1 comprises obtaining, by the sending unit 1, a random bit sequence R of length L by using a classical random number generator. In an alternative embodiment, the random bit sequence R of length L may also be predetermined and electronically stored at the sending unit 1.

The second step S2 comprises transmitting, at the sending unit 1, a first sequence of coherent electromagnetic pulses 1.1 to the receiving unit 2 via a communication channel 3. Thereby, each coherent electromagnetic pulse 1.1 of the first sequence of coherent electromagnetic pulses 1.1 corresponds to a bit of the random bit sequence R according to a ciphering protocol CP1, CP2, CP3, CP4.

Specifically, the first sequence of coherent electromagnetic pulses 1.1 is generated by using a laser source. According to the ciphering protocol CP1, CP2, CP3, CP4, the first sequence comprises multiple first coherent electromagnetic pulses and multiple second coherent electromagnetic pulses, wherein each first coherent electromagnetic pulse of the first sequence corresponds to a first coherent state $|\alpha_0\rangle$ and is assigned to a bit of the random bit sequence R with a bit value 0. Each second coherent electromagnetic pulse of the first sequence corresponds to a second coherent state $|\alpha_1\rangle$ and is assigned to a bit of the random bit sequence R with the bit value 1. Consequently, each coherent electromagnetic pulse 1.1 in the first sequence of coherent electromagnetic pulses 1.1 corresponds to a bit of the random bit sequence R.

More specifically, the ciphering protocol CP1, CP2, CP3, CP4 comprises an assignment rule and ciphering mode information. According to the ciphering mode information, intensity-ciphering is specified as a ciphering mode. According to the assignment rule, a first coherent state $|\alpha_0\rangle$ with the complex-valued coherent state amplitude $\alpha_0$ is assigned to a bit with a bit value 0, and a second coherent state $|\alpha_1\rangle$ with the complex-valued coherent state amplitude $\alpha_1$ is assigned to a bit with a bit value 1. The average photon number $\langle n_0\rangle=|\alpha_0|^2$ of the first coherent state $|\alpha_0\rangle$ is different from the average photon number $\langle n_1\rangle=|\alpha_1|^2$ of the second coherent state $|\alpha_1\rangle$. The phases of the first coherent state $|\alpha_0\rangle$ and the second coherent state $|\alpha_1\rangle$ are chosen identically. The degree of indistinguishability of the first coherent state $|\alpha_1\rangle$ and the second coherent state $|\alpha_1\rangle$ is given by the absolute value of the overlap matrix element of the first coherent state $|\alpha_0\rangle$ and the second coherent state $|\alpha_1\rangle$, i.e., for intensity-ciphering $$|\langle\alpha_0|\alpha_1\rangle|=\exp(-[\sqrt{\langle n_1\rangle}-\sqrt{\langle n_0\rangle}]^2/2)\neq 1. \quad (1)$$

According to the present embodiment, the average photon numbers $\langle n_j\rangle$ (j=0,1) are predetermined. Exemplarily, the average photon number of the first coherent state is $\langle n_0 \rangle = 1000$ and the average photon number of the second coherent state is $\langle n_1 \rangle = 1077$ in order to realize a degree of indistinguishability of $|\langle \alpha | \alpha_1 \rangle| \approx 0.5$. In an alternative embodiment, the average photon numbers $(n_j)$ (j=0, 1) may also be chosen from the result of an optimization in order to ensure an optimized and increased information advantage over an eavesdropper 4 and a maximal key generation rate as discussed further below.

In another embodiment, the ciphering mode can be phase-ciphering. In this case, the phases of the first coherent state $|\alpha_0\rangle$ and the second coherent state $|\alpha_1\rangle$ differ by a phase difference $\phi$ and the respective average photon numbers are identical $\langle n \rangle = \langle n_0 \rangle = \langle n_1 \rangle$. The degree of indistinguishability of the first coherent state $|\alpha_1\rangle$ and the second coherent state $|\alpha_1\rangle$ is then given by $$|\langle \alpha_0 | \alpha_1 \rangle| = \exp([\cos \phi - 1]\langle n \rangle) \neq 1. \tag{2}$$

Exemplarily, the average photon number of the first coherent state and the second coherent state is $\langle n \rangle = 10$ and the phase difference is $\phi = \pi$. In an alternative embodiment, the average photon numbers (n) and the phase difference may also be chosen from the result of an optimization in order to ensure an optimized and increased information advantage over an eavesdropper 4 and a maximal key generation rate.

The third step S3 comprises receiving, at the receiving unit 2, a second sequence of coherent electromagnetic pulses 2.1 corresponding to the transmitted first sequence of coherent electromagnetic pulses 1.2. Each of the received coherent electromagnetic pulses 2.1 corresponds to a received first coherent state $|\beta_B \alpha_0\rangle$ or a received second coherent state $|\beta_B \alpha_1\rangle$, where $t_B = |\beta_B|^2$ denotes the proportion of the corresponding signal received at the receiving unit 2.

The third step S3 also comprises measuring at least the intensities of the received coherent electromagnetic pulses 2.1 using at least one optical detector. The third step S3 further comprises deciphering, at the receiving unit 2, the second sequence of coherent electromagnetic pulses 2.1 based on the measured intensities and the ciphering protocol CP1, CP2, CP3, CP4 in order to obtain an approximate result for the random bit sequence R. The deciphering comprises assigning a bit value 0 or a bit value 1 to each of the received coherent electromagnetic pulses 2.1.

Since the coherent states $|\beta_B \alpha_j\rangle$ (j=0,1) that correspond to the received coherent electromagnetic pulses 2.1 are not perfectly orthogonal, some of the received coherent electromagnetic pulses 2.1 may not unambiguously be deciphered based on the measured intensities and the ciphering protocol CP1, CP2, CP3, CP4. Therefore, the fourth step S4 comprises performing unambiguous quantum state discrimination. Specifically, the fourth step S4 comprises shortening the approximate result for the random bit sequence R obtained from deciphering the received second sequence of coherent electromagnetic pulses 2.1 in the third step S3.

Thereby, any inconclusive results, i.e., bits that correspond to received coherent electromagnetic pulses 2.1 for which the measured intensities can be almost equally attributed to the first coherent state $|\alpha_0\rangle$ and the second coherent state $|\alpha_1\rangle$ are discarded. For that purpose, the receiving unit 2 announces the corresponding bits to the sending unit 1 via an authenticated public classical channel. The bits corresponding to the inconclusive results are then discarded by the sending unit 1 and the receiving unit 2, i.e., a shared bit sequence is obtained by the sending unit 1 and the receiving unit 1. The length of the shared bit sequence is L $I_{AB}$, where $I_{AB}$ denotes the mutual information of the sending unit and the receiving unit (per 1 bit of a bit sequence) estimated as $$I_{AB} = 1 - |\langle \alpha_0 | \alpha_1 \rangle|^{t_B}. \tag{3}$$

The shared bit sequence established in the fourth step S4 may not be fully secure. An eavesdropper 4 can meddle into the communication channel 3 near the sending unit 1, e.g., by bending the communication channel 3 and measuring the transcending optical modes 4.1 corresponding to the coherent states $|\beta_E \alpha_j\rangle$. Thus, the signal loss caused by an eavesdropper 4 or, equivalently, the proportion of power intercepted by an eavesdropper 4 is $r_E = |\beta_E|^2$. Since the first and second coherent states $|\alpha_j\rangle$ are quasi-classical, the eavesdropper 4 is limited to measuring a quantum number of photons corresponding to the states $|\beta_E \alpha_j\rangle$. Thus, contrary to the receiving unit 2, the eavesdropper 4 is not able to efficiently amplify the seized signal corresponding to the coherent states $|\beta_E \alpha_j\rangle$. Moreover, due to the coherent state properties of the seized signal, the following relation holds, i.e., $$\langle \beta_E \alpha_0 | \beta_E \alpha_1 \rangle = |\langle \alpha_0 | \alpha_1 \rangle|^{r_E}. \tag{4}$$

Consequently, for small signal loss $r_E$ caused by an eavesdropper 4 the states $|\beta_E \alpha_j\rangle$ are substantially non-orthogonal, and the eavesdropper 4 may not unambiguously decipher the seized signal. However, the information gained by the eavesdropper 4 may still render the shared bit sequence established in the fourth step not completely secure. Therefore, it is useful to determine the signal loss $\beta_E$ in the communication channel 3 caused by an eavesdropper 4 and estimate the information advantage $\Delta I$ over an eavesdropper 4.

The fifth step S5 comprises determining the signal loss $r_E$ in the communication channel 3 caused by an eavesdropper 4. For that purpose, first the intrinsic signal loss $r_0$ of the communication channel 3 that is not caused by an eavesdropper 4 is determined in the fifth step S5. This is achieved by transmitting an initial coherent electromagnetic pulse from the sending unit 1 to the receiving unit 2 via the communication channel 3 on a very short time scale, i.e., before an eavesdropper 4 has a chance to intrude into the communication channel 3. The initial coherent electromagnetic pulse corresponds to a classical high intensity coherent state with an average photon number of 100,000. The intensity of the transmitted initial coherent electromagnetic pulse is measured at the receiving unit 2, and the intrinsic signal loss $r_0$ is obtained from the measured intensity. In an alternative embodiment, the intrinsic signal loss $r_0$ may also be pre-determined and estimated from a theoretical model of the communication channel 3.

The signal loss $r_E$ in the communication channel 3 caused by an eavesdropper 4 is determined by transmitting randomized coherent electromagnetic test pulses from the sending unit 1 to the receiving unit 2 via the communication channel 3 at regular time intervals. Each randomized coherent electromagnetic test pulse corresponds to a high intensity coherent state with an average photon number of 10,000. The intensities of the transmitted randomized coherent electromagnetic test pulses are measured at the receiving unit 2 and compared with the intensities of the randomized coherent electromagnetic test pulses sent by the sending unit 1, e.g., via an authenticated classical public channel 5, in order to determine the total signal loss $r_t$. The signal loss $r_E$ in the communication channel 3 caused by an eavesdropper 4 is then obtained by subtracting the intrinsic signal loss $r_0$ from the total signal loss $r_t$, i.e., $r_E = (r_t - r_0)/(1 - r_0)$.

The sixth step S6 comprises estimating an information advantage $\Delta I$ over an eavesdropper 4 based on the determined signal loss $r_E$ in the communication channel 3 caused by an eavesdropper 4. The information advantage $\Delta I$ over an eavesdropper 4 is estimated using Shannon information theory.

The sixth step S6 comprises estimating the maximum of information obtained by an eavesdropper about the shared bit sequence established in the fourth step S4 according to $$\max(I_{AE}) = (1-P_B)h((1-|\langle \alpha_0 | \alpha_1 \rangle|^{r_E})/2), \quad (5)$$

where the function h(p) for a variable p denotes the binary information $$h(p) = -p \log p - (1-p)\log(1-p) \quad (6)$$

and $$P_B = 1 - I_{AB} = |\langle \alpha_0 | \alpha_1 \rangle|^{t_B} \quad (7)$$

denotes the probability that a bit is discarded by the sending unit 1 and the receiving unit 2 during information reconciliation in the fourth step S4.

The proportion $t_B$ of the signal received at the receiving unit 2 in the third step S3 is given by $$t_B = (1-r_E)(1-r_0). \quad (8)$$

The information advantage $\Delta I$ over an eavesdropper 4 is then estimated according to $$\Delta I = I_{AB} - \max(I_{AE}) \quad (9)$$

and is thus expressed in terms of the degree of indistinguishability, the determined signal loss $r_E$ caused by an eavesdropper 4 and the intrinsic signal loss $r_0$, i.e., $$\Delta I = [1 - |\langle \alpha_0 | \alpha_1 \rangle|^{(1-r_E)(1-r_0)}][1-h((1-|\langle \alpha_0 | \alpha_1 \rangle|^{r_E}/2)]. \quad (10)$$

In the seventh step S7 privacy amplification is applied to the shared bit sequence established in the fourth step S4. The privacy amplification is carried out based on the information advantage $\Delta I$ over the eavesdropper 4 estimated in the sixth step S6. In particular, a shared secret cryptographic key is distilled from the shared bit sequence established in the fourth step S4 in order to eradicate the information of an eavesdropper 4. The shared secret cryptographic key has the length $$L_f = L\Delta I, \quad (11)$$

where L denotes the length of the random bit sequence R obtained from the classical random number generator in the first step S1. Therefore, the key generation rate $L_f/L = \Delta I$ is determined by the estimate of the information advantage $\Delta I$ over an eavesdropper 4 established in the sixth step S6.

In order to obtain the secret shared cryptographic key with the length $L_f$ a key distillation procedure is carried out. For that purpose, the shared bit sequence established in the fourth step S4 is transformed using a random function g: $\{0,1\}^{LI_{AB}} \to \{0,1\}^{L_f}$ and $L_f$ bits are extracted from the shared bit sequence as a new bit string.

Since an eavesdropper 4 does not possess any information about the new bit string, the new bit string can be used as a secret cryptographic key shared between the sending unit 1 and the receiving unit 2 for secure communications.

Recurring features are provided in the following figures with identical reference signs as in FIG. 1.

Figure 2:
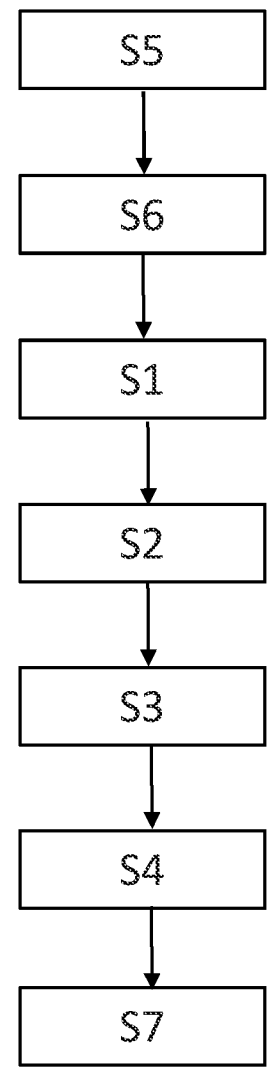
FIG. 2 shows a schematic flow diagram of another embodiment of the method.

FIG. 2 shows a schematic flow diagram of another embodiment of the method for determining a secret cryptographic key shared between a sending unit 1 and a receiving unit 2 for secure communication.

The embodiment shown in FIG. 2 differs from the embodiment discussed with respect to FIG. 1 in that the fifth step S5 and the sixth step S6 are carried out before the second step S2 is carried out. The estimating of the information advantage $\Delta I$ in the sixth step S6 then comprises optimizing the information advantage $\Delta I$ for the signal loss $r_E$ caused by an eavesdropper 4 and the intrinsic loss $r_0$ that have both been determined in the fifth step S5.

Figure 5:
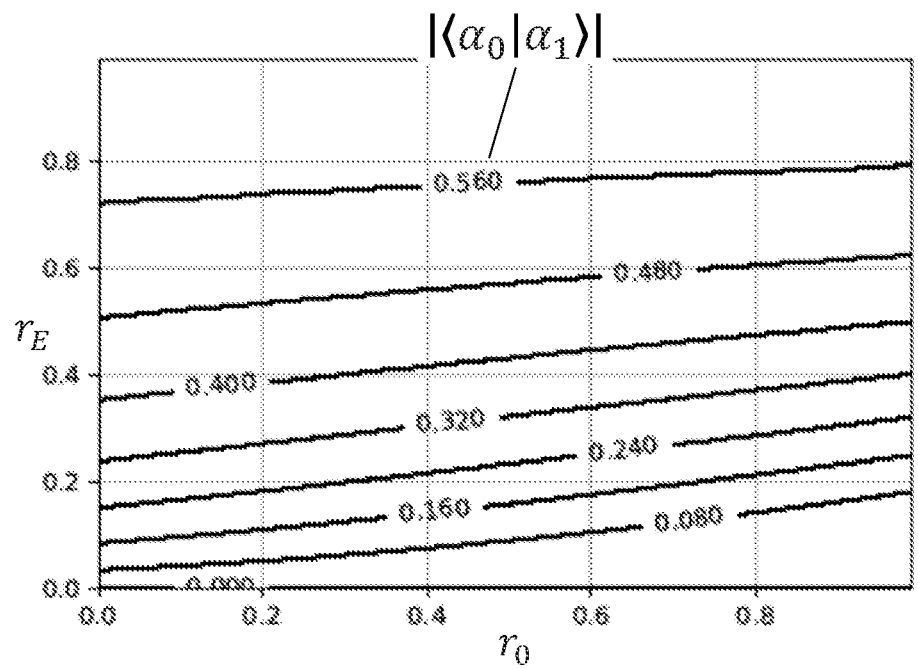
FIG. 5 shows the dependence of the optimal degree of indistinguishability on the signal loss caused by an eavesdropper and the intrinsic signal loss.
Figure 6:
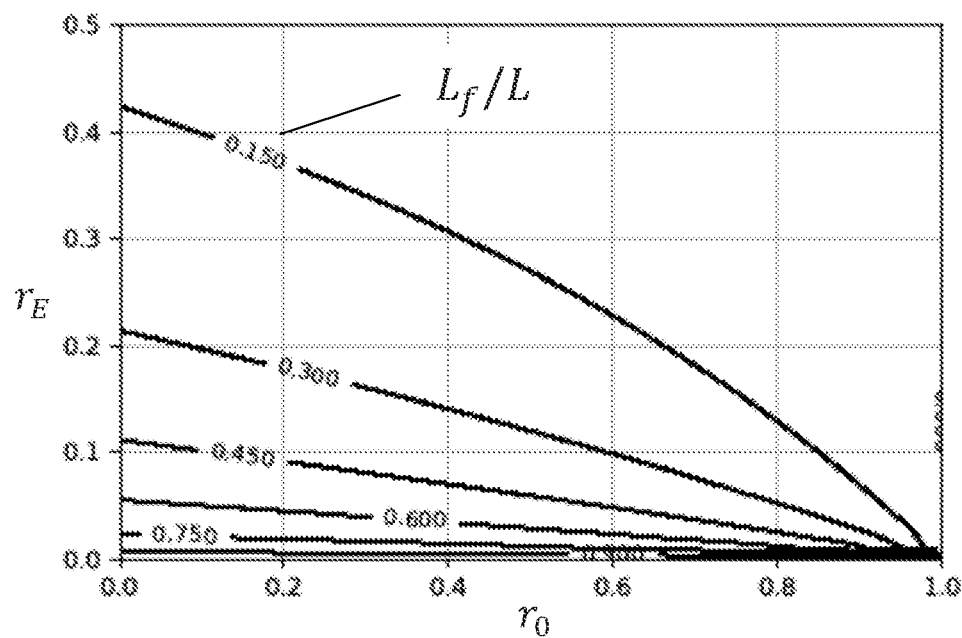
FIG. 6 shows the dependence of the key exchange rate on the signal loss caused by an eavesdropper and the intrinsic signal loss.

For that purpose the expression for the information advantage $\Delta I$ as derived further above is optimized as a function of the degree of indistinguishability of the first coherent state $|\alpha_0\rangle$ and the second coherent state $|\alpha_1\rangle$ by standard numerical means, wherein the degree of indistinguishability represents a ciphering parameter. More specifically, the optimal value for the degree of indistinguishability is determined, wherein the optimal value corresponds to the maximal information advantage $\Delta I$ over an eavesdropper 4. Results of such an optimization are shown in FIGS. 5 and 6.

The optimal value for the degree of indistinguishability is then used to determine the ciphering protocol CP1, CP2, CP3, CP4 in order to ensure a maximal information advantage $\Delta I$ over an eavesdropper 4. Thereby, the average photon number $\langle n_0 \rangle$ of the first coherent state $|\alpha_0\rangle$ and the average photon number $\langle n_1 \rangle$ of the second coherent state $|\alpha_1\rangle$ of the ciphering protocol CP1, CP2, CP3, CP4 are chosen such that their degree of indistinguishability corresponds to its optimal value. With the ciphering protocol CP1, CP2, CP3, CP4 optimized in this way, the second step S2 is carried out. Moreover, the maximal value 0 f the information advantage $\Delta I$ obtained from the optimization is used as an estimate for the information advantage $\Delta I$ for privacy amplification, as described in the seventh step S7.

Figure 3:
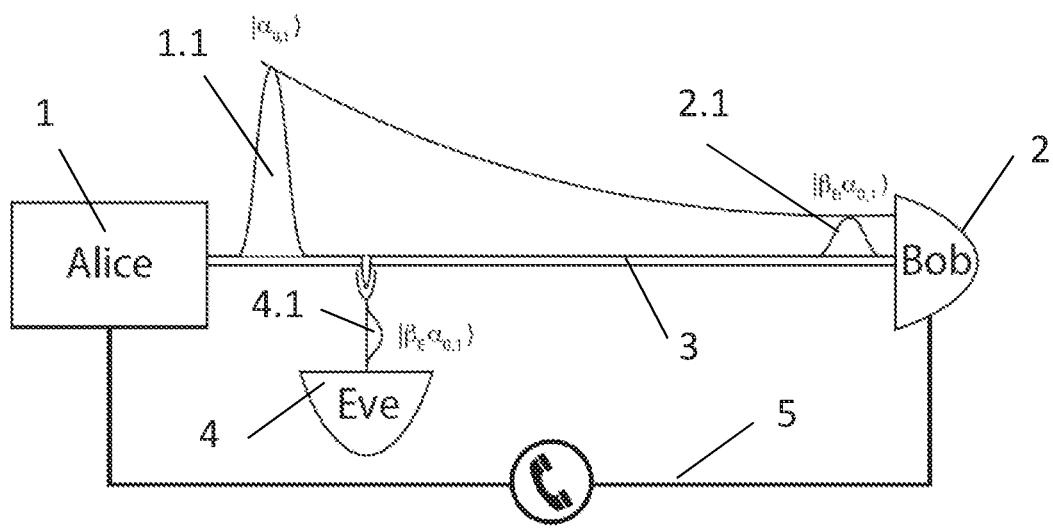
FIG. 3 shows a schematic diagram of an embodiment of the apparatus.

FIG. 3 shows a schematic diagram of an embodiment of the apparatus configured to carry out the steps of the method for determining a secret cryptographic key shared between a sending unit 1 and a receiving unit 2 for secure communication.

The apparatus comprises one sending unit 1, one receiving unit 2 and a transmission line or optical fibre as a communication channel 3.

The sending unit 1 comprises a first electronic evaluation and control unit, a classical random number generator and a laser as a coherent electromagnetic radiation source (not shown). The classical random number generator is configured to generate the random bit sequence R. The laser is configured to generate the first sequence of coherent electromagnetic pulses 1.1.

An eavesdropper 4 meddles into the communication channel 3 near the sending unit 1. The eavesdropper 4 is configured to seize part of the signal 4.1 corresponding to the first sequence of coherent electromagnetic pulses 1.1.

The receiving unit 2 comprises a second electronic evaluation and control unit and an optical detector (not shown). The optical detector is configured to receive the second sequence of coherent electromagnetic pulses 2.1. The apparatus further comprises an authenticated public classical channel (not shown).

The sending unit 1 is configured to perform the first step S1. The sending unit 1 and the communication channel 3 are configured to perform the second step S2. The receiving unit 2 is configured to perform the third step S3. The sending unit 1, the receiving unit 2 and the authenticated public classical channel are configured to perform the fourth step S4.

The sending unit 1, the receiving unit 2 and the communication channel 3 are configured to perform the fifth step S5. The receiving unit 2 is configured to perform the sixth step S6. The sending unit 1, the receiving unit 2 and the authenticated public classical channel are configured to perform the seventh step S7.

Figure 4:
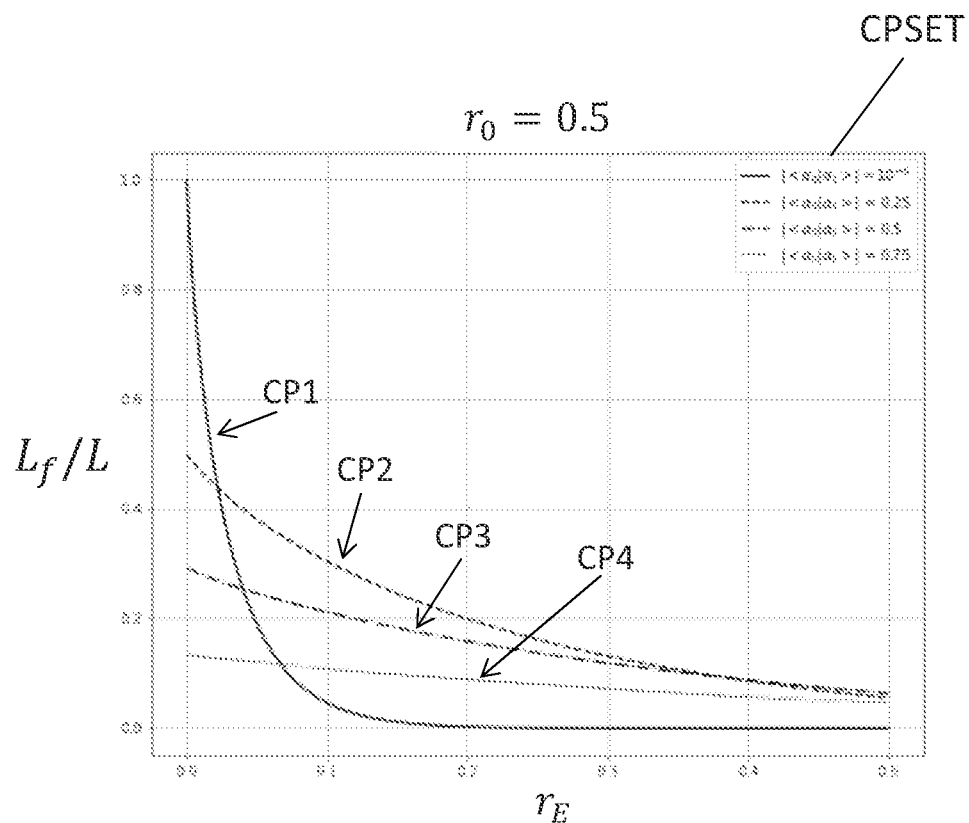
FIG. 4 shows the dependence of the key generation speed on the signal loss caused by an eavesdropper for a predetermined set of ciphering protocols each comprising a different degree of indistinguishability.

FIG. 4 shows the dependence of the key generation speed $L_f$ divided by the random number generation speed L on the signal loss $r_E$ caused by an eavesdropper 4 for an intrinsic loss $r_0$=0.5 and a discrete predetermined set of ciphering protocols CPSET including a first ciphering protocol CP1, a second ciphering protocol CP2, a third ciphering protocol CP3 and a fourth ciphering protocol CP4. The ciphering protocols CP1, CP2, CP3, CP4 differ by the degree of indistinguishability of the first coherent state $|\alpha_0\rangle$ and the second coherent state $|\alpha_1\rangle$. From the discrete set of ciphering protocols CP1, CP2, CP3 and CP4, the third ciphering protocol CP3 ensures the maximal information advantage $\Delta I$ and maximal key generation speed $L_f/L$ for a signal loss $r_E$ caused by an eavesdropper 4 smaller than 0.05. It can be derived from FIG. 4 that with increasing signal loss $r_E$ the optimal degree of indistinguishability ensuring a maximal information advantage $\Delta I$ increases while the maximal achievable information advantage $\Delta I$ decreases.

FIG. 5 shows the dependence of the optimal degree of indistinguishability on the signal loss $r_E$ caused by an eavesdropper 4 and the intrinsic signal loss $r_0$. Shown are constant contour lines for the optimal degree of indistinguishability as a result of the optimization of the information advantage $\Delta I$ as discussed further above. Exemplarily, for a signal loss $r_E$=0.4 caused by an eavesdropper 4 and the intrinsic signal loss $r_0$=0.3, the optimal value for the degree of indistinguishability is $|\langle\alpha_0|\alpha_1\rangle|\approx 0.4$. The first coherent state and the second coherent state of the ciphering protocol CP1, CP2, CP3, CP4 are then chosen correspondingly. The results shown in FIG. 5 are thus used to determine the optimal ciphering protocol CP1, CP2, CP3, CP4 used in the second step S2.

Correspondingly, FIG. 6 shows the maximal key exchange rate $L_f/L$ corresponding to the maximal information advantage $\Delta I$ and its dependence on the signal loss $r_E$ caused by an eavesdropper 4 and the intrinsic signal loss $r_0$. Shown are constant contour lines for the maximal key exchange rate $L_f/L$ corresponding to the maximal information advantage $\Delta I$ as a result of the optimization of the information advantage $\Delta I$ as discussed further above.

Exemplarily, for a signal loss $r_E$=0.1 caused by an eavesdropper 4 and the intrinsic signal loss $r_0$=0.6 the maximal information advantage is $\Delta I = L_f/L \approx 0.150$. The length $L_f$ of the shared secure cryptographic key established through privacy amplification in step S7 is then chosen correspondingly. The results shown in FIG. 6 are thus used to determine the key exchange rate in the seventh step S7.

Features of the different embodiments which are merely disclosed in the exemplary embodiments as a matter of course can be combined with one another and can also be claimed individually.

The invention claimed is:

1. A method for determining a secret cryptographic key shared between a sending unit and a receiving unit for secure communication, the method comprising:
   a first step of obtaining, by the sending unit, a random bit sequence R,
   a second step of transmitting, at the sending unit, a first sequence of electromagnetic pulses to the receiving unit via a communication channel, wherein each electromagnetic pulse of the first sequence of electromagnetic pulses corresponds to a bit of the random bit sequence R according to a ciphering protocol; wherein the ciphering protocol comprises assigning a bit of the random bit sequence R with bit value 0 to a first quantum state and a bit of the random bit sequence R with bit value 1 to a second quantum state;
   a third step of receiving, at the receiving unit, a second sequence of electromagnetic pulses corresponding to the transmitted first sequence of electromagnetic pulses, and deciphering the second sequence of electromagnetic pulses based on the ciphering protocol,
   a fourth step of performing information reconciliation based on the received second sequence of electromagnetic pulses in order to establish a shared bit sequence, and
   a fifth step of determining a signal loss $r_E$ in the communication channel caused by an eavesdropper,
   a sixth step of estimating an information advantage $\Delta I$ over the eavesdropper based on the degree of indistinguishability between the first quantum state and the second quantum state, the determined signal loss $r_E$ caused by the eavesdropper and an intrinsic signal loss $r_0$ in the communication channel, the degree of indistinguishability between the first quantum state and the second quantum state being the absolute value of the overlap matrix element of the first quantum state and the second quantum state, the information advantage $\Delta I$ being estimated by subtracting the maximum of information gained by the eavesdropper about the shared bit sequence from mutual information of the sending unit and receiving unit, and
   a seventh step of performing privacy amplification based on the shared bit sequence and the estimated information advantage $\Delta I$ in order to establish a shared secret cryptographic key.

2. The method according to claim 1, wherein the fifth step and the sixth step are carried out before the second step is carried out, and the estimating of the information advantage $\Delta I$ in the sixth step comprises optimizing the information advantage $\Delta I$ for the signal loss $r_E$ determined in the fifth step as a function of at least one ciphering parameter, and determining the ciphering protocol according to the optimization result in order to ensure a maximal information advantage $\Delta I$ over the eavesdropper.

3. The method according to claim 2, wherein the at least one ciphering parameter corresponds to the degree of indistinguishability between the first quantum state and the second quantum state.

4. The method according to claim 1, wherein at least the electromagnetic pulses of the first sequence of electromagnetic pulses are coherent electromagnetic pulses; and/or
   the ciphering protocol comprises an assignment rule, wherein according to the assignment rule a first coherent electromagnetic pulse and/or a first coherent state as a first quantum state is assigned to a bit value 0 and a second coherent electromagnetic pulse and/or a second coherent state as a second quantum state is assigned to a bit value 1; and/or
   the ciphering protocol comprises ciphering mode information, wherein according to the ciphering mode information a ciphering mode is an intensity ciphering or a phase ciphering.

5. The method according to claim 1, wherein the fourth step comprises sending feedback information from the receiving unit to the sending unit using an authenticated public classical channel, wherein the feedback information includes information about inconclusive results obtained from the deciphering of the second sequence of electromagnetic pulses at the receiving unit.

6. The method according to claim 1, wherein the determining of the signal loss $r_E$ in the communication channel caused by the eavesdropper comprises transmitting at least one randomized electromagnetic test pulse from the sending unit to the receiving unit via the communication channel, and determining the signal loss $r_E$ in the communication channel caused by the eavesdropper from the at least one randomized electromagnetic test pulse detected at the receiving unit.

7. The method according to claim 6, wherein the at least one randomized electromagnetic test pulse is a high-intensity coherent electromagnetic pulse.

8. The method according to claim 6, wherein the at least one randomized electromagnetic test pulse comprises a random pulse intensity and/or a random pulse phase and/or a random pulse duration and/or a random pulse shape.

9. The method according to claim 1, further comprising adapting the ciphering protocol after the fourth step is carried out, and repeatedly carrying out at least the second step, the third step and the fourth step based on the adapted ciphering protocol in order to increase a length of the shared bit sequence in the fourth step, and/or to decrease an error rate of deciphering in the fourth step.

10. The method according to claim 1, wherein the privacy amplification in the seventh step comprises distilling from the shared bit sequence obtained in the fourth step a shared secret cryptographic key with length $L_f = L\Delta I$, where L is the length of the random bit sequence R and $\Delta I$ is the information advantage estimated in the sixth step.

11. An apparatus configured to carry out the steps of the method according to claim 1, wherein the apparatus comprises at least one sending unit and at least one receiving unit coupled by at least one communication channel.

12. The apparatus according to claim 11, wherein:
the at least one sending unit comprises a random number generator configured to generate the random bit sequence R; and/or
the at least one sending unit comprises an electromagnetic radiation source configured to generate the first sequence of electromagnetic pulses and/or at least one randomized electromagnetic test pulse; and/or
the at least one receiving unit comprises a detector unit configured to measure intensities and/or phases of the second sequence of electromagnetic pulses and/or of at least one randomized electromagnetic test pulse; and/or
the apparatus additionally comprises at least one authenticated public classical channel configured to transmit feedback information from the at least one receiving unit to the at least one sending unit for information reconciliation and/or privacy amplification.

13. The apparatus according to claim 11, wherein the at least one communication channel is a transmission line or an optical fibre; and/or
the at least one communication channel comprises in-line amplifiers configured to amplify the transmitted first sequence of electromagnetic pulses in or along the communication channel; and/or
the receiving unit and/or the at least one communication channel is configured to exhibit intrinsic losses only due to Rayleigh scattering.

\* \* \* \* \*